United States Patent

Jagadeesan

(10) Patent No.: US 6,801,622 B1
(45) Date of Patent: Oct. 5, 2004

(54) DEVICES, SOFTWARE AND METHODS FOR PASSING DTMF SIGNALS UNDER VOICE COMPRESSION

(75) Inventor: Ramanathan T. Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 09/703,336

(22) Filed: Oct. 31, 2000

(51) Int. Cl.[7] .................... H04M 1/00; H04M 3/00; H04M 5/00
(52) U.S. Cl. .................... 379/386; 379/283
(58) Field of Search .................... 379/283, 284, 379/286, 339, 399.01, 399.02, 403, 404, 416, 418; 370/353, 354, 356

(56) References Cited

U.S. PATENT DOCUMENTS

| | | | | |
|---|---|---|---|---|
| 4,833,399 A | * | 5/1989 | So ........................... 324/76.28 |
| 5,119,322 A | * | 6/1992 | Stroobach ................... 708/312 |
| 5,325,425 A | * | 6/1994 | Novas et al. .......... 379/100.14 |
| 5,521,967 A | * | 5/1996 | Novas et al. .......... 379/100.14 |
| 5,666,357 A | * | 9/1997 | Jangi .......................... 370/345 |
| 5,694,466 A | * | 12/1997 | Xie et al. .................... 379/386 |
| 5,825,871 A | * | 10/1998 | Mark ..................... 379/357.03 |
| 5,907,597 A | * | 5/1999 | Mark ....................... 379/93.03 |
| 5,949,874 A | * | 9/1999 | Mark .......................... 379/283 |
| 6,504,838 B1 | * | 1/2003 | Kwan .......................... 370/352 |
| 6,549,587 B1 | * | 4/2003 | Li ............................... 375/326 |

* cited by examiner

*Primary Examiner*—Binh Tieu
(74) *Attorney, Agent, or Firm*—Marger Johnson & McCollom, PC

(57) ABSTRACT

Devices, software and methods are provided for encoding DTMF signals for telephone connections between digital voice communication systems that use compression, such as wireless connections or network connections. First the twist of the DTMF signals is determined, and then it is determined whether the twist is within a mapped range of a remote decoder. If not, the signal is first balanced to change the twist, and then the balanced signal is encoded.

24 Claims, 4 Drawing Sheets

360

380

DEVICES, SOFTWARE AND METHODS FOR PASSING DTMF SIGNALS UNDER VOICE COMPRESSION

BACKGROUND OF THE INVENTION

1. Field of the Invention

The present invention is related to the field of telephony, and more specifically to devices, software and methods for encoding while compressing DTMF tones.

2. Description of the Related Art

A feature that is increasingly used in telephony is passing Dual Tone Multi Frequency (DTMF) DTMF tones over a regular telephone connection. These tones are emitted by the user pushing the buttons on his telephone, while a telephone line is held open. These tones are passed through the telephone line along with voice, and are recognized by the remote system at the other end of the telephone line.

The DTMF tones are passed for a variety of purposes. One such purpose is to give answers to an automated remote system, for better routing of a call. Such systems are said to employ interactive voice response (IVR), and are used in increasing numbers of applications, for example in telephone banking. IVR permits automating a remote system, and serving many customers at once, with fewer delays.

An evolving challenge is to transmit regular telephone conversations while using compression. That may occur if the transmission is wireless. It may also occur if the transmission is over a network such as the internet, as opposed to over a regular, conventional telephone line. In that case, the voice of the conversations will be sent in packets under a voice over internet protocol (VoIP).

A problem arises when compressing DTMF sounds. That is because the DTMF sounds emitted from the user's telephone might not be recognized at the other end. The reason is as follows.

DTMF signals consist of two tones, a high frequency tone H and a low frequency tone L. Each of these tones has an amplitude Am(tone). The difference in amplitudes is called the twist T, which is preferably measured in decibels (dB). In particular, $$T = Am(H) - Am(L) \quad \text{Equation (1)}$$

By their nature, conventional telephone lines attenuate (in other words, diminish the amplitude) of the high frequency tone H. If this problem were left unattended, then according to Equation (1), there would be less twist T at the other end. So much less, that it might not enable IVR over conventional telephone lines. This problem has been addressed by some telephones preemphasizing the amplitudes of the high frequency. In other words, Am(H) is increased. This will permit IVR over regular telephone lines.

A problem arises due to the preemphasis and other reasons associated with compression. After the encoded twist is decoded, it may be outside a recognition range of the decoder. In that case, the DTMF sound is not recognized, and the IVR simply does not work. This should not be surprising, because encoders and decoders (codecs) were initially designed for passing voice signals, not DTMF tones.

Nevertheless, it is desirable to be able to pass DTMF tones through telephone connections, even when low bit rate voice coding is used, to implement IVR and other features. It is so desired whether the telephone device of the user preemphasizes amplitude of the high frequency or not.

BRIEF SUMMARY OF THE INVENTION

The present invention overcomes these problems and limitations of the prior art.

Generally, the present invention provides devices, software and methods for encoding DTMF signals for telephone connections between digital voice communication systems that use compression, such as wireless connections or network connections. The invention teaches to determine the twist of the DTMF tone in the signal, and to determine whether the twist is within a mapped range of a decoder. If not, the signal is first balanced to change the twist, and then the balanced signal is encoded.

As a result, when the encoded signal is eventually decoded, the resulting DTMF tone will have a twist that will be within the range of remote decoder. This way the DTMF tones will be perceptible for IVR.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software and methods for passing DTMF signals through telephone connections between digital voice communication systems. Such systems include wireless telephone systems, e.g. cellular telephones, and systems that communicate through networks, such as under a VoIP protocol. Various embodiments are now described.

Figure 1A:
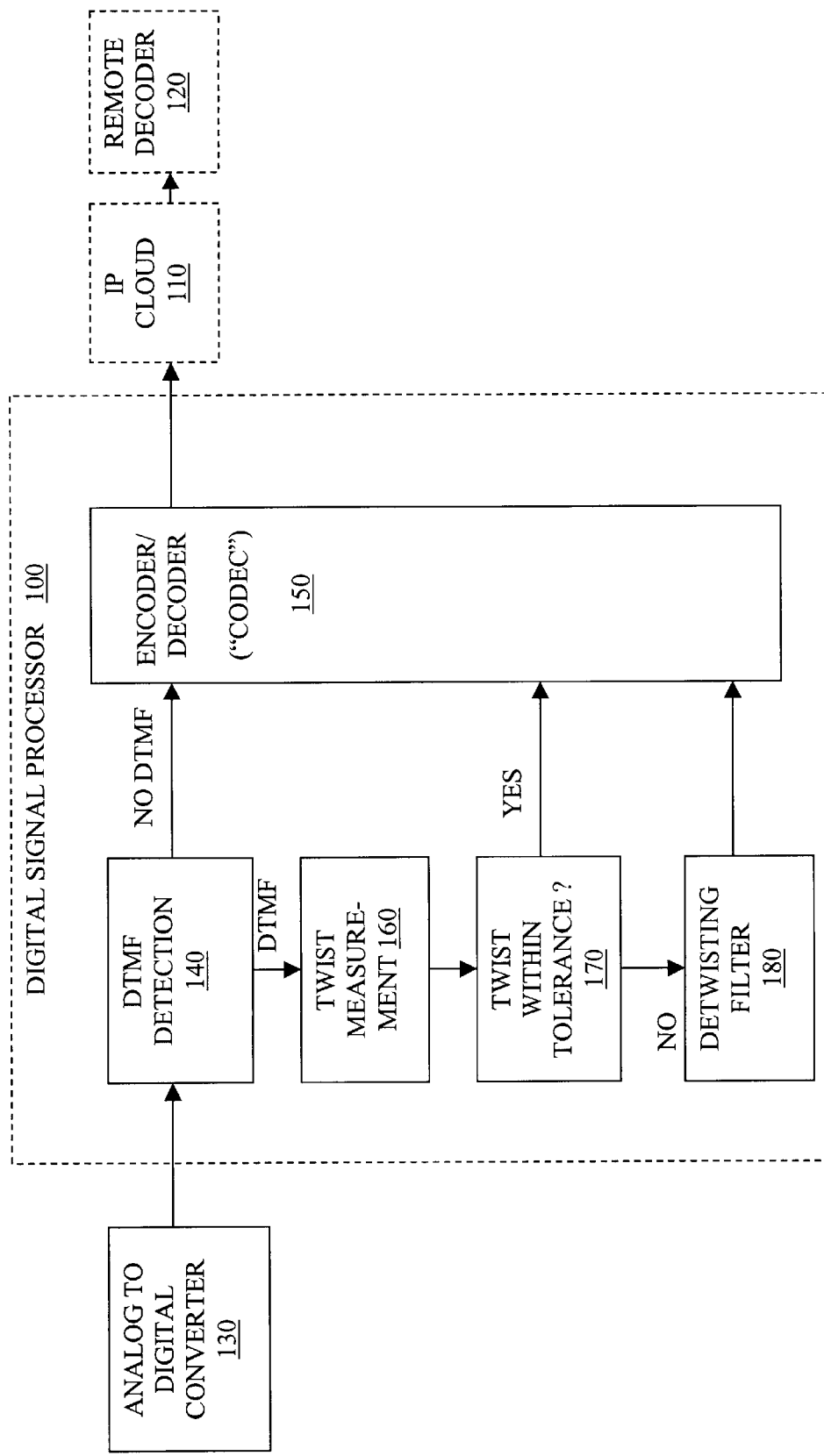
FIG. 1A is a block diagram of a circuit for transmitting to a network according to an embodiment of the invention.

Referring now to FIG. 1A, a digital signal processor 100 made according to the invention is described in more detail. Processor 100 is intended for connection to an internet protocol (IP) cloud 110. A remote decoder 120, accessible through the IP cloud 110, is intended to receive the output of processor 100. The transmission is intended to be under a Voice over Internet Protocol (VoIP).

An analog to digital converter 130 receives an analog sound signal, and converts it to a digital signal, for inputting in processor 100. The sound signal includes voice, along with DTMF sounds.

Digital signal processor 100 can be implemented in a variety of ways. While various components are presented herein only once, it will be apparent to persons skilled in the art that these components can be implemented as stand-alone hardware units that include logic circuitry. Alternately, these components can be implemented as separate processing modules of the processor 100, which can include a microcontroller or a microprocessor. If a microprocessor is involved, it can be implemented in conjunction with a memory, on which a program can reside. The program includes a set of instructions according to the invention, to perform the process of the invention to the data of the input signal, and produce output data.

Digital signal processor 100 optionally and preferably includes a DTMF detection module 140. Module 140 determines whether the sound represented in the digital input signal includes DTMF sounds. If not, the digital input signal is routed to an encoding module 150. The encoding module 150 is preferably implemented as an encoder/decoder 150, which is also known in the art as a "codec". After the encoding module 150 encodes the digital input signal, it transmits it to the IP cloud 110.

Digital signal processor 100 also includes a module 160 for determining a twist T of the DTMF tone represented in the digital input signal. The digital input signal is routed to module 160 by module 140, if it is determined that the sound it represents includes at least one DTMF tone. Module 160 determines the twist T according to Equation (1) above. In other words, it includes a module for determining an amplitude of a high frequency tone of the DTMF tone, a module for determining an amplitude of a low frequency tone of the DTMF tone, and a module for determining a difference in the amplitudes.

Digital signal processor 100 additionally includes a conforming module 170 for determining whether the measured twist T is within a mapped range of the remote decoder 120. This is now described in more detail.

Figure 1B:
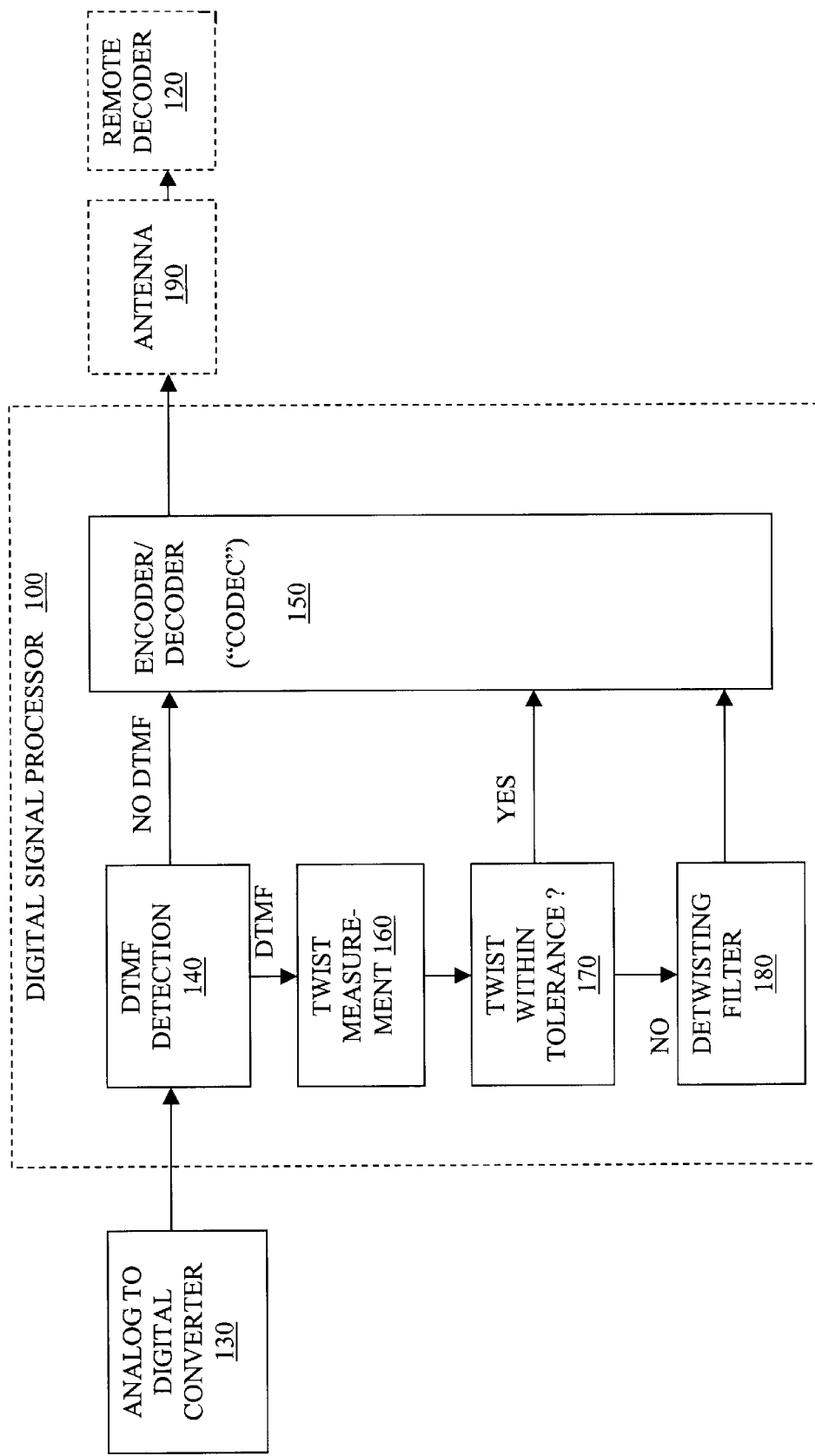
FIG. 1B is a block diagram of a circuit for transmitting voice data wirelessly according to an embodiment of the invention.

Referring now to FIG. 1B, another circuit according to the invention is shown. The circuit has the same components of interest as that of FIG. 1A. The notable difference is that processor 100 is for transmitting through an antenna 190, for a wireless connection. Indeed, the circuit of FIG. 1B is intended for an application such as a wireless telephone, a personal digital assistant, etc. In this case, the remote decoder 120 can be part of a base station for the wireless telephone.

For the embodiments of both FIG. 1A and FIG. 1B, the person skilled in the art will realize that more structure is used. Indeed, in the embodiment of FIG. 1A a transmit buffer is preferably included, etc. This additional structure is not shown, however, so as not to complicate unnecessarily the present description.

Figure 2:
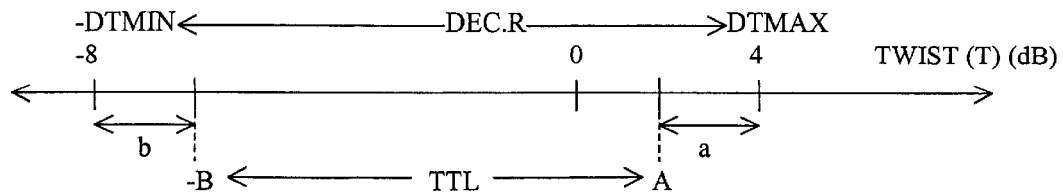
FIG. 2 is a graph for illustrating transmission tolerance limits according to the invention.

Referring now to FIG. 2, a horizontal line is used for graphing the various possible values of the measured twist T, the range of the remote decoder 120, and the mapped range. The values are given in units of deciBell (dB).

The range DEC.R of the remote decoder 120 is between a minimum value of −DTMIN and a maximum value of DTMAX. Typically, −DTMIN=8 dB, and DTMAX=4 db. This leaves the range DEC.R of the remote decoder 120 a range of 12 dB.

In designing digital signal processor 100, certain values are known of codec 150. These values include a preemphasis a and a deemphasis b that are imparted by codec 150 in encoding the DTMF tones. The values for the preemphasis and the deemphasis are used to compute the mapped range TTL for the remote decoder 120 as follows:

$$A = DTMAX - a \qquad \text{Equation (2)}$$

$$-B\ DTMIN + b \qquad \text{Equation (3)}$$

The mapped range TTL, also known as the usable twist tolerance limit TTL is between −B and A. The mapped range thus has a value given by equation (4):

$$TTL = A + B \qquad \text{Equation (4)}$$

It will now be understood that module 170 determines whether Equation (5) holds for the measured twist T.

$$-B = < T = < A \qquad \text{Equation (5)}$$

If conforming module 170 determines that Equation (5) holds, then the input digital signal is not altered. It is routed to encoder 150 for encoding, with the confidence that remote decoder 120 will decode it within the range DEC.R.

Processor 100 also includes a balancing module, for balancing the digital input signal prior to encoding it. Balancing is such that the twist T is changed, if it has been found to be outside the range TTL. Balancing is preferably performed such that the digital input signal is altered, so that the twist T is brought within the range TTL.

The balancing module is preferably implemented by a detwisting filter 180. The detwisting filter 180 is for filtering either the high frequency tone H, or the low-frequency tone L of the DTMF tone. Filtering will attenuate the amplitude of the filtered tone. According to Equation (1), attenuating Am(H) will decrease the twist T, while attenuating Am(L) will increase it. In either case, filtering will alter the digital input signal, enough to where its twist will be brought within the range TTL.

The detwisting filter 180 may have to be implemented by a bank of individual filters. This is because the range TTL may be too small, and filtering for one value of T that is too large, may make it too small. Accordingly, the number of individual filters is determined from the size of the mapped range TTL.

More particularly, if the twist T is larger than A, the number of individual filters that can be provided is N(H), given by:

$$N(H) = 1 + (a/TTL) \qquad \text{Equation (6)}$$

In this scheme, each individual filter j (j=0, 1, ..., N(H)−1), will have a threshold twist T(H,j) and result in an attenuation D(H,j), that are given by:

$$T(H,j) = A + j \times TTL \qquad \text{Equation (7)}$$

$$D(H,j) = (j+1) \times TTL \qquad \text{Equation (8)}$$

Equivalently, if the twist T is smaller than B, the number of individual filters that can be provided is N(L), given by:

$$N(L) = 1 + (b/TTL) \qquad \text{Equation (9)}$$

In this scheme, each individual filter j (where j=0, 1, ..., N(H)−1), will have a threshold twist T(L,j) and result in an attenuation D(L,j), that are given by:

$$T(L,j) = -(B + j \times TTL) \qquad \text{Equation (10)}$$

$$D(L,j) = (j+1) \times TTL \qquad \text{Equation (11)}$$

Equation (6) and Equation (9) will determine the numbers of individual filters of the detwisting filter 180. The total number of individual filters can be N(H)+N(L).

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they can be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming can use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention can be implemented by themselves, or in combination with others. Even though it is said that the program can be stored in a computer-readable medium, it should be clear to a person skilled in the art that it need not be a single memory, or even a single machine. Various portions, modules or features of it can reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These can be optionally performed in conjunction with one or more human operators performing some, but not all of them. As per the above, the users need not be collocated with each other, but each only with a machine that houses a portion of the program. Alternately, some of these machines can operate automatically, without users and/or independently from each other.

Methods of the invention are now described in more detail.

Figure 3A:
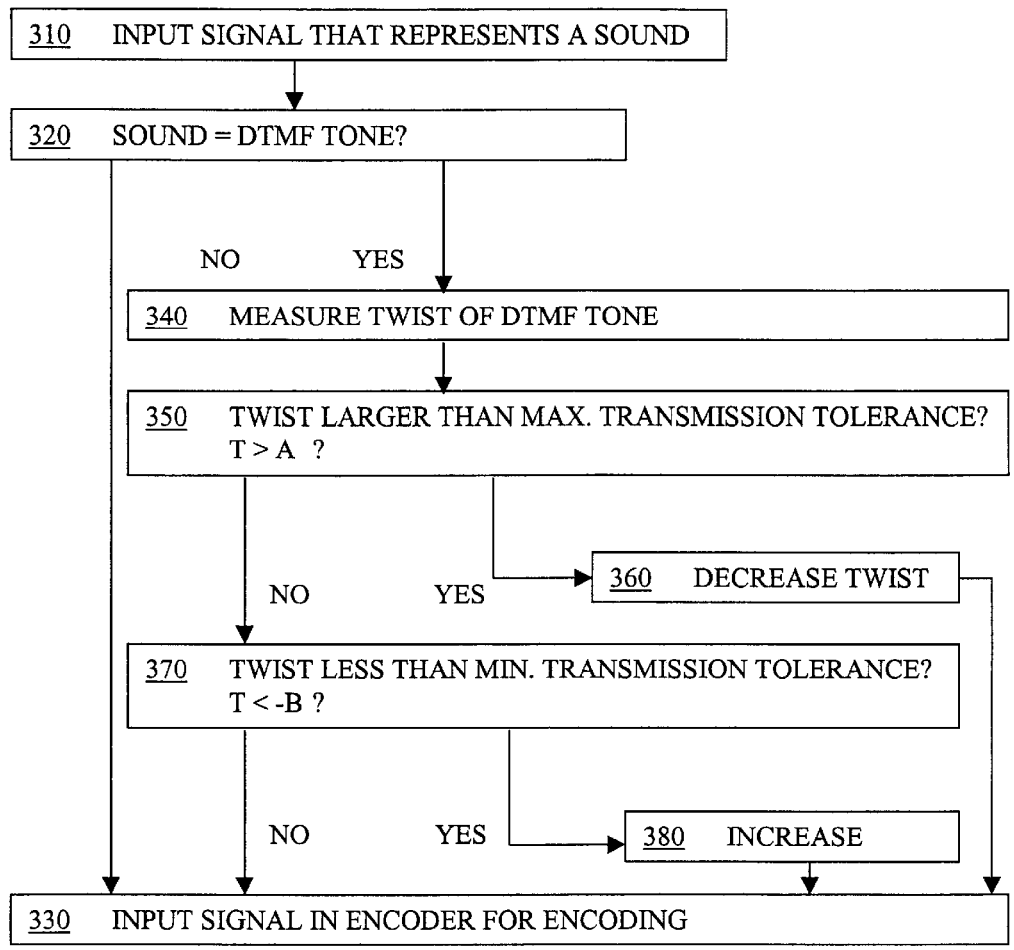
FIG. 3A is a flowchart illustrating a general method of the invention.

Referring now to FIG. 3A, a flowchart 300 is used for illustrating a main method according to the invention.

According to a box 310, a signal is input, that represents a sound. It can be known that the signal represents a sound, in the case of a telephone, or determined if the signal is for transmission under a Voice over Internet Protocol (VoIP). Otherwise, it can be determined separately.

According to a next box 320, it is determined whether the sound includes a DTMF tone. If not, then according to a next box 330, the signal is input in an encoder for encoding.

If yes, then according to a box 340, a twist T of the DTMF tone is measured. This is performed by measuring the amplitudes Am(tone) of the high frequency tone H and the low frequency tone L of the DTMF signal, and subtracting them according to Equation (1).

According to a next box 350, it is determined whether the twist T is larger than a maximum transmission tolerance A. The maximum transmission tolerance A is known for the encoder, from knowing DTMAX and a, according to equation (2).

If yes, then according to a box 360, the twist T is decreased. This can be performed by filtering a high frequency H of the DTMF tone by a detwisting filter. If the detwisting filter includes many individual filters, then the twist is decreased as is described with reference to FIG. 3B. After decreasing the twist T, the signal now represents a DTMF sound, which is altered from the original, to be within the tolerance limits of the encoder. Then execution returns to box 330, and the signal is input to the encoder.

If the twist T is not larger than the maximum transmission tolerance A at box 350, then according to box 370, it is determined whether the twist T is less than the minimum transmission tolerance B. The minimum transmission tolerance B is known for the decoder, from knowing –DTMIN and b, according to equation (3).

If not, it means that the twist T was always within the transmission tolerance limits, as indicated by Equation (5). Then execution proceeds to box 330, and the signal has remained unaltered.

If yes, then according to box 380, the twist T is increased. This can be performed by filtering a low frequency L of the DTMF tone by a detwisting filter. If the detwisting filter includes many individual filters, then the twist is increased as is described with reference to FIG. 3C. The resulting signal now represents a DTMF sound whose twist T is within the mapped range TTL of the remote decoder 120. Then again execution proceeds to box 330.

Figure 3B:
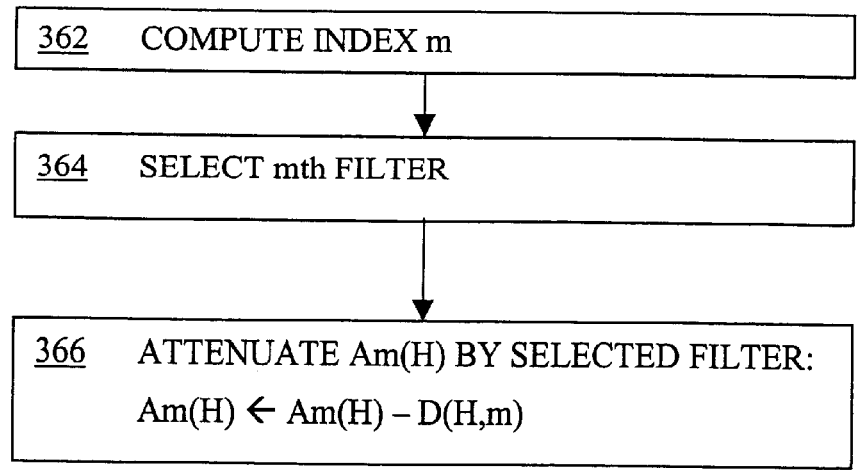
FIG. 3B is a flowchart illustrating details of a specific box of the method of FIG. 3A.

Referring now to FIG. 3B, a flowchart 360 is used to describe a box 360 of the flowchart of FIG. 3A. A person skilled in the art will realize that this is useful in the event that equation (6) has yielded more than one individual filters.

According to a box 362, an index m is computed from the twist T. The index m is computed to determine which one of the individual filters will be used, by determine which filtering range should be used. The index m is computed to satisfy equation (12) below:

$$T(H,m-1)=<T<T(H,m) \qquad \text{Equation (12)}$$

The index m is computed as an integer, by substituting in Equation (12) values from Equation (7), subtracting A, and dividing by TTL:

$$m-1=<(T-A)/TTL<m \qquad \text{Equation (13)}$$

According to a next box 364, the mth filter is selected.

According to a next box 366, the high frequency tone is filtered by the mth filter. Its amplitude is attenuated accordingly. This is accomplished by passing the whole tone through the mth filter. Preferably characteristics of the mth filter are such that the high frequency tone is attenuated with respect to the low frequency tone.

Figure 3C:
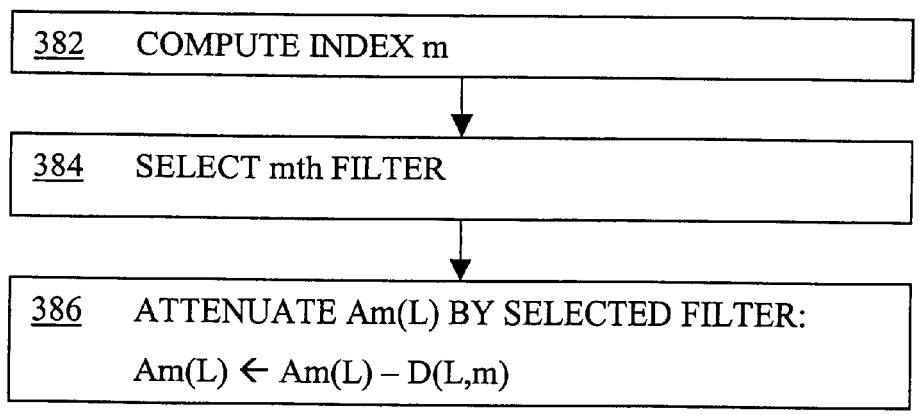
FIG. 3C is a flowchart illustrating details of a specific box of the method of FIG. 3A.

Referring now to FIG. 3C, a flowchart 380 is used to describe a box 380 of the flowchart of FIG. 3A. A person skilled in the art will realize that this is useful in the event that equation (9) has yielded more than one individual filters.

According to a box 382, an index m is computed from the twist T. The index m is computed to determine which one of the individual filters will be used, by determine which filtering range should be used. The index m is computed to satisfy equation (14) below:

$$T(L,m-1)>=T>T(L,m) \qquad \text{Equation (14)}$$

The index m is computed as an integer, by substituting in Equation (14) values from Equation (10), adding B, and dividing by TTL:

$$-(m-1)>=(T+B)/TTL>-m \qquad \text{Equation (15)}$$

According to a next box 384, the mth filter is selected.

According to a next box 386, the low frequency tone is filtered by the mth filter. Its amplitude is attenuated accordingly. This is accomplished by passing the whole tone through the mth filter. Preferably characteristics of the mth filter are such that the low frequency tone is attenuated with respect to the high frequency tone.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

The invention claimed is:

1. A digital signal processor comprising:

a module for identifying a twist of a Dual Tone Multi Frequency (DTMF) tone in a sound signal;

an encoding module for encoding the sound signal into digital transmission data;

a conforming module for identifying a preemphasis and a deemphasis that would be imparted on the twist of the DTMF tone during the encoding and determining whether the twist after preemphasis and deemphasis of the DTMF tone would be within a mapped range of a remote decoder that decodes the digital transmission data back into the sound signal; and a balancing module for balancing the sound signal prior to encoding so that the identified twist is within the mapped range of the remote decoder.

2. The processor of claim 1, wherein the balancing module attenuates an amplitude of a high frequency or a low frequency of the DTMF tone to bring the twist within a twist tolerance limit (TTL) for the remote decoder.

3. The processor of claim 1, wherein the module for determining a twist includes:

a module for determining an amplitude of a high frequency tone of the DTMF tone;

a module for determining an amplitude of a low frequency tone of the DTMF tone; and a module for determining a difference in the amplitudes.

4. The processor of claim 1, wherein the balancing module includes:

a detwisting filter for filtering one of a high frequency tone and a low frequency tone of the DTMF tone.

5. The processor of claim 4, wherein the detwisting filter provides a plurality of individual filters and the conforming module:

computes an index according to the amount of identified twist; and selects one of the plurality of individual filters according to the computed index, the selected one of the individual filters attenuating a high frequency DTMF tone when the twist is larger than a maximum transmission tolerance for the encoder and the selected one of the individual filters attenuating a low frequency DTMF tone when the twist is less than a minimum transmission tolerance for the encoder.

6. The processor of claim 5, wherein a number of the individual filters depends on a size of the mapped range.

7. A device comprising:

a network interface for coupling to a network; and a processor coupled with the network interface, wherein the processor is adapted to:

determine a twist of a Dual Tone Multi Frequency (DTMF) tone represented in a received sound signal;

determine how the twist for the DTMF tone will be varied when the received sound signal is encoded into digital transmission data;

determine whether the varied twist is within a mapped range of a decoder receiving the digital transmission data over a network;

balancing the received sound signal to change the twist when the encoding would vary the twist outside of a twist tolerance limit for the decoder; and inputting the balanced received sound signal in an encoder.

8. The device of claim 7, wherein the processor is further adapted to attenuate a high frequency DTMF tone to decrease the twist when the twist is greater than a maximum twist tolerance limit and attenuate a low frequency DTMF tone to increase the twist when the twist is less than a minimum twist tolerance limit.

9. The device of claim 7, wherein the processor is adapted to determine the twist by:
   determining an amplitude of a high frequency tone of the DTMF tone;
   determining an amplitude of a low frequency tone of the DTMF tone; and
   determining a difference in the amplitudes.

10. The device of claim 7, wherein the processor is further adapted to:
    input the received sound signal in the encoder without balancing, if the determined twist is within the mapped range.

11. The device of claim 7, wherein the processor is adapted to balancing by:
    filtering one of a high frequency tone and a low frequency tone of the DTMF tone.

12. The device of claim 11, wherein the processor is adapted to filtering by
    selecting one of a plurality of individual filters of a detwisting filter; and
    filtering by the selected individual filter.

13. An article comprising: a storage medium, said storage medium having stored thereon instructions, that, when executed by at least one device, result in:
    determining a twist of a Dual Tone Multi Frequency (DTMF) tone represented in a first received sound signal;
    determining how the twist for the DTMF tone is varied when the sound signal is encoded into digital data for transferring over a network;
    determining whether the varied twist is within a mapped range of a decoder receiving the digital data over the network; and
    balancing the first received sound signal to change the twist when the varied twist would be outside of a twist tolerance limit for the decoder; and
    inputting the balanced first received sound signal in an encoder.

14. The article of claim 13, wherein the instructions further result in:
    determining that the first received sound signal represents the DTMF tone.

15. The article of claim 13, wherein the instructions result in determining the twist by:
    determining an amplitude of a high frequency tone of the DTMF tone;
    determining an amplitude of a low frequency tone of the DTMF tone; and
    determining a difference in the amplitudes.

16. The article of claim 13, wherein the instructions further result in:
    inputting the first received sound signal in the encoder without balancing, if the determined twist is within the mapped range.

17. The article of claim 13, wherein the instructions result in balancing by filtering one of a high frequency tone and a low frequency tone of the DTMF tone.

18. The article of claim 17, wherein the instructions result in filtering by:
    selecting one of a plurality of individual filters of a detwisting filter; and
    filtering by the selected individual filter.

19. A digital signal processor comprising:
    determining means for determining a twist of a DTMF tone represented in a first signal;
    encoding means for encoding the first signal;
    conforming means for determining how the twist for the DTMF tone is varied when the sound signal is encoded into digital data for transferring over a network and whether the varied twist is within a mapped range of a decoder; and
    balancing means for balancing the first received signal prior to encoding it to change the twist, if the measured twist is not within the mapped range.

20. The processor of claim 19, further comprising:
    detection means for determining that the first received signal represents the DTMF tone.

21. The processor of claim 19, wherein the determining means includes:
    means for determining an amplitude of a high frequency tone of the DTMF tone;
    means for determining an amplitude of a low frequency tone of the DTMF tone; and
    means for determining a difference in the amplitudes.

22. The processor of claim 19, wherein the balancing means includes:
    detwisting filter means for filtering one of a high frequency tone and a low frequency tone of the DTMF tone.

23. The processor of claim 22, wherein
    the detwisting filter means includes a plurality of individual filter means.

24. The processor of claim 23, wherein
    a number of the individual filter means depends on a size of the mapped range.

* * * * *